United States Patent Office 3,390,031
Patented June 25, 1968

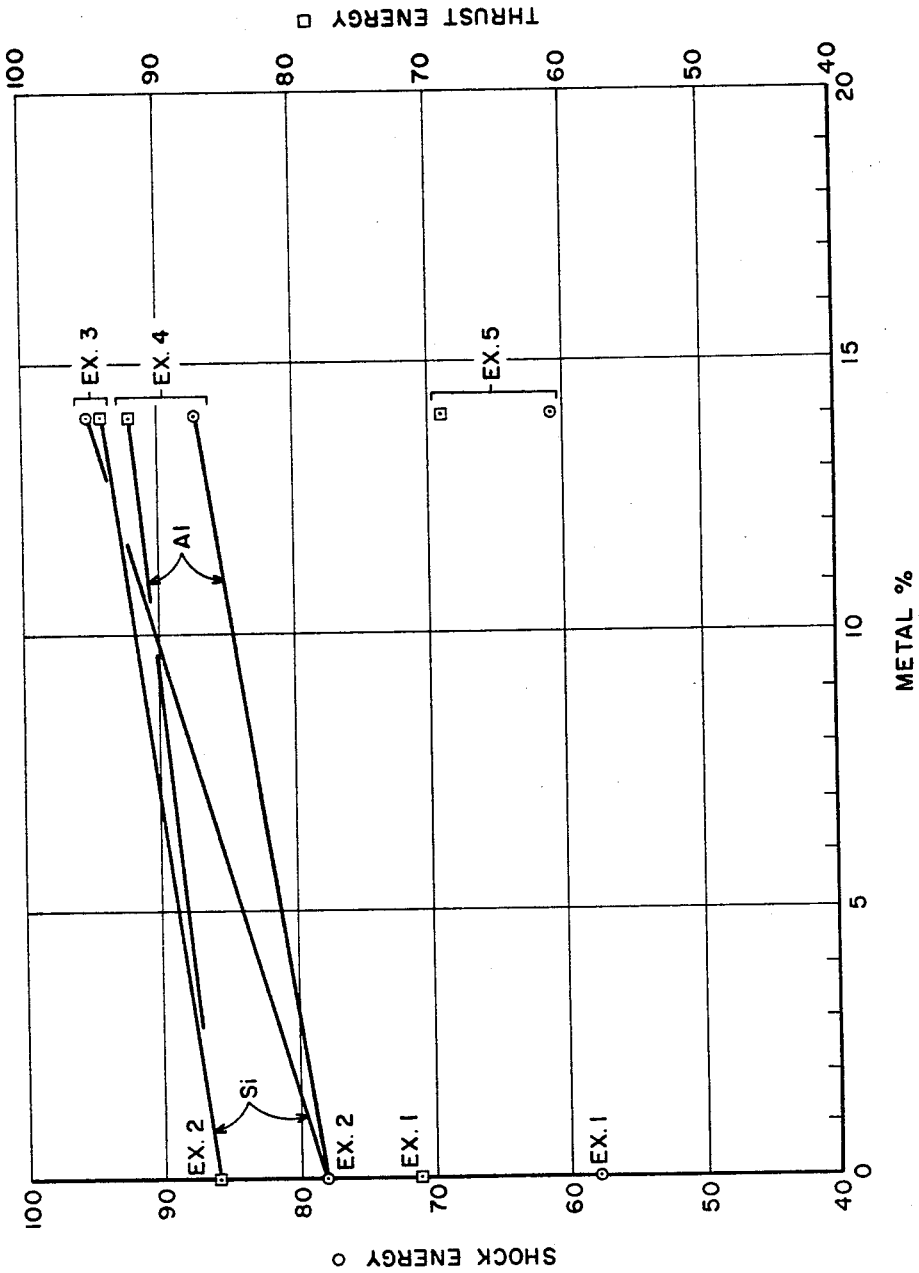

3,390,031
GELLED AQUEOUS SLURRY EXPLOSIVE
COMPOSITION CONTAINING AN INORGANIC NITRITE
Alfred A. Albert, Wilmington, Del., assignor to Hercules Incorporated, Wilmington, Del., a corporation of Delaware
Filed Jan. 4, 1967, Ser. No. 607,259
6 Claims. (Cl. 149—45)

ABSTRACT OF THE DISCLOSURE

An aeration agent having an in situ gas generating material for adjusting and improving the control of the specific gravity of a gelled aqueous slurry explosive composition at the time of blasting. Sodium, potassium, calcium and barium nitrites are such gas generating materials.

---

This invention relates to aeration agents and more particularly to an improved aeration agent for adjusting and improving the control of the specific gravity of a gelled aqueous slurry explosive composition at the time of blasting.

The advantages of incorporating aeration agents, for specific gravity or density control, into aqueous slurry explosives have been disclosed by Ferguson et al. (U.S. 3,288,658) and Swisstack (U.S. 3,288,661).

Now in accordance with the present invention an improved in situ gas generating chemical has been discovered which provides a reliably stable and efficient specific gravity control for prolonged periods. As disclosed in the aforementioned patents, the control of specific gravity or density provides a means for energy control of the explosive and in addition can be employed to impart increased sensitivity, shock energy and thrust energy as will be further demonstrated herein.

More specifically, the present invention is directed to an improved aeration agent for adjusting and improving the control of the specific gravity of a gelled aqueous slurry explosive composition at the time of blasting, wherein the improvement comprises at least one gas generating material of the group consisting of sodium nitrite, potassium nitrite, calcium nitrite and barium nitrite.

Examples of operation of the invention are given for aqueous slurry blasting explosives without and with metal fuels wherein it will be noted that Examples 1 and 2 contained no metal, Example 3 contained silicon, and Example 4 contained aluminum and Example 5 contained silicon. Furthermore, it will be noted that Examples 1 and 5 do not contain the aeration agent of this invention. These examples are given in Table I and were prepared as follows.

Example 1

(1) Combine the pine oil, AN and SN with the water of solution (hot) and heat to 100° F.
(2) Mix the smokeless powder into the solution.
(3) Adjust the pH to between 4.5 and 5.0 with acetic acid.
(4) Disperse the guar gum in about 3 times its weight of ethylene glycol and mix into the solution.
(5) Disperse the guar gum cross-linking agent in the remaining glycol and mix into the solution.

Examples 2, 3, 4 and 5

Steps 1, 2, 3 and 4 are the same as for Example 1 except that pine oil is omitted in Step 1 and the silicon or aluminum are also added in Step 2.

Step 5. Disperse the sodium nitrite in about 3½ times its weight of water and add to the mix.

Step 6. Disperse the guar gum cross-linking agent in the glycol remaining from Step 4 and mix into the solution.

TABLE I

| Example No | 1 | 2 | 3 | 4 | 5 |
|---|---|---|---|---|---|
| Components: | | | | | |
| Silicon (6% on 100 mesh) | | | 14.0 | | 14.0 |
| Aluminum Granules (90% on 100 mesh) | | | | 14.0 | |
| Water | 17.0 | 17.0 | 17.0 | 17.0 | 17.0 |
| Ammonium Nitrate, prills | 41.7 | 41.7 | 28.0 | 28.0 | 28.0 |
| Sodium Nitrate, prills | 13.0 | 13.0 | 12.6 | 12.6 | 12.6 |
| Ground Smokeless Powder | 25.0 | 25.0 | 25.0 | 25.0 | 25.0 |
| Ethylene Glycol | 2.5 | 2.5 | 2.5 | 2.5 | 2.5 |
| Guar Gum | 0.7 | 0.7 | 0.7 | 0.7 | 0.7 |
| Guar Gum Cross-linking Agent | 0.08 | 0.08 | 0.08 | 0.08 | 0.08 |
| Pine Oil | 0.1 | | | | |
| Sodium Nitrite | | 0.065 | 0.065 | 0.065 | |
| Oxygen Balance, percent | −1.7 | −1.7 | −18.3 | −16.7 | −18.3 |
| Final 24 Hour Specific Gravity | ¹1.45 | 1.25 | 1.35 | 1.29 | ¹1.52 |
| pH | 4.8 | 4.5 | 4.7 | 4.9 | 4.2 |
| Detonation Rate, M/S | 5,000 | 5,400 | 5,550 | 5,250 | 5,250 |
| Pipe Diameter, inches | 5 | 5 | 5 | 5 | 5 |
| Booster | XC-49 | XC-49 | XC-49 | XC-49 | XC-49 |
| Slurry Temperature, ° F | 45 | 36 | 37 | 43 | 43 |
| Underwater Measured Energy Weight Basis, Relative to Confined 60% HP Gel: | | | | | |
| Shock Energy | 0.58 | 0.78 | 0.95 | 0.87 | 0.61 |
| Thrust Energy | 0.71 | 0.86 | 0.94 | 0.92 | 0.69 |

¹ Maximum.

All of the examples shown in Table I were tested for explosive energy and detonation rate while confined underwater. Detonation rates were measured over a length of 20 cm. and were recorded on a counter chronograph. The underwater thrust (bubble) and shock energies were determined in the manner indicated by Cole (Cole, H. C., Underwater Explosions, Princeton University Press, Princeton, N.J. (1948), pages 228 to 285) and as reported by Sadwin (Sadwin, L. D., Cooley, C. M., Porter, S. J., Stresau, R. H; Underwater Evaluation of the Performance of Explosives, International Symposium on Mining Research, Missouri, February 1961, vol. 1) and his collaborators with some minor modifications.

The data are reported relative to confined 60% HP gel. The charges, 20 lb. to 30 lb. in weight, are confined in 5-inch diameter by 28-inch long black iron pipe. The pipes were suspended vertically, 12 feet below the surface of the water to the charge center, and 28 feet from the bottom of the pond. The charges were initiated from the bottom with XC–49 pentolite boosters (50/50 PETN/TNT), 3-inch diameter by 1-inch high and 190 grams in weight. The pressures generated by the detonations were sensed by piezoelectric hydrophone transducers and were recorded on an oscilloscope. The bubble times were also sensed by the transducers and were recorded on the oscilloscope.

With reference to the examples, it will be noted that all compositions shot with a high detonation rate and a pronounced increase in shock energy and thrust energy occurred as between Examples 1 and 2 wherein the latter contained the aeration agent and neither one a metal fuel. An outstanding result was that the silicon composition of Example 3 gave thrust energy values and shock energy value superior to that of the aluminum composition of Example 4. Another outstanding result was that the composition of Example 5 containing 14% silicon had shock and thrust energy values about equal to only that of Example 1 containing no metal nor aeration. This is shown graphically in the attached drawing. Thus the improvement and importance in utilizing the aeration agent of the present invention may be fully appreciated.

Still another outstanding result was the ability of the aeration agent of this invention to develop a substantially constant specific gravity for the explosive compositions over a sustained period of time. This is important, since under field conditions a charge after placing in a borehole may be fired a considerable time later amounting to days. This advantage, it is believed, is attributable to the following. Addition of appropriate amounts of sodium nitrite to a slurry under reaction conditions produces gas believed to be nitrogen. The nitrogen is produced slowly developing and maintaining the desired low density. The density reduction is efficient, is reproducible and stable. This density reduction is achieved without materially changing the composition of a slurry and can be varied easily and accurately.

This improved aeration agent for density control is applicable to all slurry gels providing reaction conditions are present. The rate of the reaction

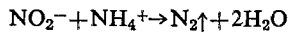

$$NO_2^- + NH_4^+ \rightarrow N_2\uparrow + 2H_2O$$

varies with pH and temperature. Acidity of the base slurry can be varied from about pH 3 to about pH 6, depending upon the rate of reaction desired with increased acidification accelerating the reaction and decreased temperature deaccelerating the reaction.

It will be appreciated that the ammonium cation in the above equation is ordinarily introduced by the presence of ammonium nitrate. When, however, it is desired to entirely replace the ammonium nitrate with another inorganic oxidizing salt or salts, such as, sodium nitrate or sodium perchlorate for example, it is necessary to incorporate a compound which is water soluble and contains nitrogen in the negative oxidation state. Suitable compounds are those having the general formula R—NH$_2$ where R is an acyl, alkanol or alkane group. Preferred compounds include urea and sulfamic acid, wherein the former may be included as a portion of the carbonaceous fuel and the latter may be incorporated in an amount in the order of 1 to 1 molar ratio of acid to nitrite.

In Table II, Example 6 shows compositions in parts by weight in which it will be noted that the sodium nitrite held a substantially constant specific gravity from 20 hours to 116 hours residence. Moreover, it will be appreciated that the gas generated in addition to being substantially water insoluble is inert, therefore, contributing an additional safety factor to the explosives utilizing the aeration agent of this invention.

TABLE II

Example 6

Components:
    Water _____ 16.9
    Ammonium nitrate (prills) _____ 53.5
    Sodium nitrate (coarse) _____ 16.1
    Ethylene glycol _____ 11.1
    Ground coal _____ 1.2
    Natural guar gum _____ 1.2
    Cross-linking agent _____ 0.2
    Sodium nitrite _____ 0.09
    Fumaric acid _____ 0.03
Initial temp., ° F. _____ 110
Final pH _____ 4.5
Maximum specific gravity _____ 1.46
Specific gravity after, hour:
    20 _____ 1.03
    44 _____ 1.02
    116 _____ 1.02

A particularly effective method for controlling the rate of aeration in a typical ammonium nitrate blasting explosive is to incorporate sulfamic acid in the composition in proportions of one mole to one mole of nitrite, or less, and to subsequently introduce the nitrite. The rate of aeration is proportional to the amount of the sulfamic acid added, far beyond the effect expected from its acid properties. The sulfamic acid appears to in fact be reacting preferentially with the $NO_2^-$ present according to the following equation—

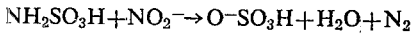

$$NH_2SO_3H + NO_2^- \rightarrow O^-SO_3H + H_2O + N_2$$

It is evident that there are several factors which will influence conditions for the most satisfactory operation of the invention. For example, the method of introduction of the reacting chemicals forming the aeration agent of this invention may be in the form of particulate dry solids, solutions or suspensions. These chemicals as a solution suspension or dry may be added to the slurry as mixed, or a solution or suspension thereof may be injected into the gravity flow conduit of the slurry after mixing, or a solution or suspension thereof may be injected into the pumped flow conduit of the slurry after mixing and pumping. In all these variations, the aerated product may be directly charged into packages where desired or directly pumped into a bore-hole.

Moreover, the present invention contemplates as the aeration agent the utilization of in situ gas generating materials of the group consisting of sodium nitrite, potassium nitrite, calcium nitrite, and barium nitrite and mixtures thereof present in an amount of from about 0.01 to about 0.50% by weight of the gelled aqueous slurry explosive composition and preferably in an amount of from about 0.02 to about 0.25% by weight. The term "aeration agent" as used herein means an agent which causes the explosive composition to be combined with or charged with gas. The term "maximum specific gravity" as used herein means the specific gravity of the aqueous slurry explosive composition exclusive of gas.

Within the range of the aforementioned amounts are gelled aqueous slurry explosive compositions having specific gravities lowered to between about 30 and 95% of maximum for those containing explosive sensitizing agents and lowered to between about 30 and 90% of maximum for those containing non-explosive ingredients. Furthermore, it will be appreciated that benefits from the invention inure when the aeration agent of the present invention is utilized with gelled aqueous slurry compositions containing explosive sensitizers, such as smokeless powder as demonstrated here and including TNT, RDX, PETN, HBX, and the like, as well as aqueous slurry compositions in which all ingredients per se are non-explosive. Additionally, it will be appreciated that benefits from the invention inure when the aeration agent of the present invention is utilized with gelled aqueous slurry compositions containing non-explosive energizers other than aluminum and silicon or combined therewith, such as, calcium silicide, calcium boride, silicon carbide, ferrosilicon, magnesium alloy and the like.

Suitable thickeners include cross-linkable materials, such as, carboxymethylcellulose and guar gum to form the gelled aqueous slurry explosive. Guar gum present in cross-linked form is preferred in conjunction with the present invention to impart a plastic but easily deformable consistency for retaining the dispersed gas ingredient over prolonged periods as packaged or placed into bore-holes.

It will be seen, therefor, that this invention may be carried out by the use of various modifications and changes without departing from its spirit and scope, with only such limitations placed thereon as are imposed by the appended claims.

What I claim and desire to protect by Letters Patent is:

1. An improved explosive composition comprising at least one gas generating material of the group consisting of sodium nitrite, potassium nitrite, calcium nitrite and barium nitrite dispersed in a gelled aqueous slurry explosive composition of the inorganic oxidizer salt type in which said gas generating material causes said composition to be charged wth gas in an amount sufficient for adjusting and maintaining a predetermined specific gravity for said composition.

2. The composition according to claim 1 wherein the released gas of the gas generating material is substantially water insoluble and inert.

3. The composition according to claim 2 wherein the gas generating material is sodium nitrite.

4. The composition according to claim 2 wherein the gas generating material is potassium nitrite.

5. The composition according to claim 2 wherein the gas generating material is calcium nitrite.

6. The composition according to claim 2 wherein the gas generating material is barium nitrite.

References Cited

UNITED STATES PATENTS

| | | | |
|---|---|---|---|
| 2,255,602 | 9/1941 | Taylor | 149—45 X |
| 2,789,043 | 4/1957 | Maxwell et al. | 149—45 X |
| 2,993,767 | 7/1961 | Berl et al. | 149—45 X |
| 3,017,301 | 1/1962 | Engelhardt | 149—45 |
| 3,249,474 | 5/1966 | Clay et al. | 149—44 X |
| 3,288,658 | 11/1966 | Ferguson et al. | 149—109 X |
| 3,288,661 | 11/1966 | Swisstack | 149—2 X |
| 3,294,601 | 12/1966 | Gordon | 149—60 |

CARL D. QUARFORTH, *Primary Examiner.*

BENJAMIN R. PADGETT, *Examiner.*

S. J. LECHERT, Jr., *Assistant Examiner.*